United States Patent
Behrendt et al.

(10) Patent No.: US 11,423,343 B2
(45) Date of Patent: Aug. 23, 2022

(54) DYNAMIC CONSTRUCTION OF CLOUD SERVICES

(71) Applicant: KYNDRYL, INC., New York, NY (US)

(72) Inventors: Michael M. Behrendt, Sindelfingen-Maichingen (DE); Simon D. Moser, Stuttgart (DE); Ruediger Schulze, Boeblingen (DE); Thomas Spatzier, Holzgerlingen (DE); Natalie Speiser, Stuttgart (DE)

(73) Assignee: KYNDRYL, INC., New York, NY (US)

( * ) Notice: Subject to any disclaimer, the term of this patent is extended or adjusted under 35 U.S.C. 154(b) by 990 days.

(21) Appl. No.: 14/667,914

(22) Filed: Mar. 25, 2015

(65) Prior Publication Data
US 2016/0283879 A1 Sep. 29, 2016

(51) Int. Cl.
| | | |
|---|---|---|
| *G06Q 10/06* | (2012.01) | |
| *G06F 11/14* | (2006.01) | |
| *H04L 41/5054* | (2022.01) | |
| *H04L 41/5041* | (2022.01) | |

(52) U.S. Cl.
CPC ... *G06Q 10/06313* (2013.01); *G06Q 10/0633* (2013.01); *G06F 11/1425* (2013.01); *G06F 11/1471* (2013.01); *H04L 41/5045* (2013.01); *H04L 41/5054* (2013.01)

(58) Field of Classification Search
CPC ............... H04L 41/0893; H04L 41/145; H04L 41/5045; H04L 51/046; H04L 67/145; H04L 67/26; H04L 67/2819; H04L 67/327; H04W 24/02; H04W 4/005; H04W 12/06; H04W 28/10; H04W 28/12; H04W 48/14;
(Continued)

(56) References Cited

U.S. PATENT DOCUMENTS

| | | | | |
|---|---|---|---|---|
| 6,442,663 | B1* | 8/2002 | Sun | G06F 9/4862 |
| | | | | 711/202 |
| 7,487,395 | B2* | 2/2009 | van Ingen | G06F 11/1466 |
| | | | | 714/16 |
| 2004/0111430 | A1* | 6/2004 | Hertling | G06Q 10/06 |

(Continued)

FOREIGN PATENT DOCUMENTS

WO   WO-2004114061 A2 *  12/2004  ............. G06Q 10/06

OTHER PUBLICATIONS

"Bus." A Dictionary of Computing (6 ed.), Oxford University Press, 2008. (Year: 2008).*
(Continued)

*Primary Examiner* — Mehmet Yesildag
(74) *Attorney, Agent, or Firm* — Ken Han; Andrew M. Calderon; Roberts Calderon Safran & Cole, P.C.

(57) ABSTRACT

Embodiments of the present invention provide systems and methods for constructing a plan for creating a cloud service. In one embodiment, a configurator receives a request for one or more services making up a cloud service, and a preliminary plan for the requested services is generated. A service provider determines that it is able to fulfill a requested service, and inserts a sub plan for fulfilling the requested service into the preliminary plan. A final plan is generated, which includes a sub plan from each service provider inserted into the preliminary plan.

20 Claims, 5 Drawing Sheets

(58) Field of Classification Search
CPC ....... H04W 4/001; H04W 4/12; H04W 84/04; H04W 8/18; H04W 8/20; G06F 15/177
USPC .............................................. 705/4; 709/224
See application file for complete search history.

(56) References Cited

U.S. PATENT DOCUMENTS

| | | | |
|---|---|---|---|
| 2005/0097224 A1 | 5/2005 | Chen et al. | |
| 2007/0150329 A1* | 6/2007 | Brook | G06Q 10/063112 705/7.41 |
| 2007/0174815 A1* | 7/2007 | Chrysanthakopoulos | G06F 8/20 717/120 |
| 2009/0099860 A1 | 4/2009 | Karabulut et al. | |
| 2009/0119673 A1* | 5/2009 | Bubba | G06F 9/50 718/104 |
| 2009/0157419 A1* | 6/2009 | Bursey | H04W 4/70 705/346 |
| 2010/0262451 A1* | 10/2010 | Bahrami | G06Q 10/0633 705/7.27 |
| 2011/0041136 A1* | 2/2011 | Messier | G06F 9/5066 718/105 |
| 2012/0089727 A1* | 4/2012 | Raleigh | H04L 12/14 709/224 |
| 2012/0297249 A1* | 11/2012 | Yang | G06F 9/5072 714/19 |
| 2013/0007242 A1 | 1/2013 | Wang et al. | |
| 2013/0218618 A1* | 8/2013 | Purcell | G06Q 10/06 705/7.13 |
| 2013/0232230 A1* | 9/2013 | Dettinger | H04L 67/32 709/219 |
| 2014/0109083 A1 | 4/2014 | Scheidel et al. | |
| 2014/0280966 A1* | 9/2014 | Sapuram | H04L 41/5054 709/226 |
| 2015/0222501 A1* | 8/2015 | Dettori | H04L 41/50 709/223 |
| 2016/0092990 A1* | 3/2016 | Dziuba | G06Q 40/08 705/4 |

OTHER PUBLICATIONS

F. Costa, D. de Oliveira, K. Ocaña, E. Ogasa'wara, J. Dias and M. Mattoso, "Handling Failures in Parallel Scientific Workflows Using Clouds," 2012 SC Companion: High Performance Computing, Networking Storage and Analysis, 2012, pp. 129-139, doi: 10.1109/SC.Companion.2012.28. (Year: 2012).*

* cited by examiner

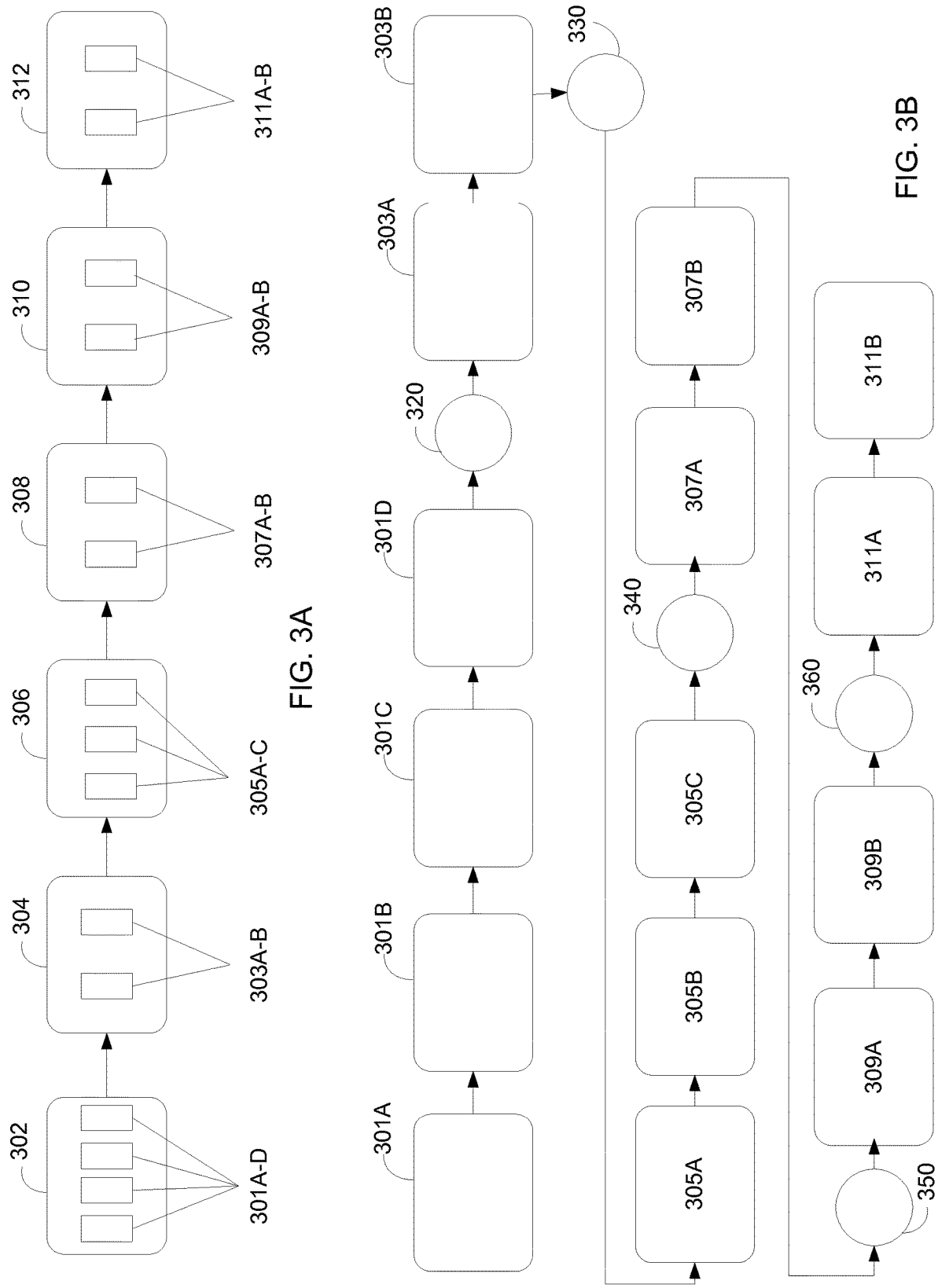

DYNAMIC CONSTRUCTION OF CLOUD SERVICES

BACKGROUND OF THE INVENTION

The present invention relates generally to the field of cloud services, and more particularly to dynamically constructing and executing a plan for creating a cloud service based on multiple services.

Service choreography and service orchestration are known concepts in the art for describing the collaboration of services in cloud management systems. Service choreography is demonstrated through the message-based interactions of a set of services, which work together to achieve a larger goal. Each of the services acts individually, on its own, and only the next actor needs to be known to build a cloud service.

Service orchestration implements a central orchestrator to control and steer the interactions between services. The orchestrator executes a plan to compose a cloud service, and the tasks and order of the plan are known at the time of implementation.

SUMMARY

According to one embodiment of the present invention, a method for constructing a plan for creating a cloud service is provided, the method comprising: A method for constructing a plan for creating a cloud service, the method comprising the steps of: receiving, at a configurator, a request for a cloud service, wherein the cloud service comprises one or more services, and wherein one or more service providers are configured to perform the one or more services; generating, by the configurator, a first plan, wherein the first plan comprises workflow steps representing the one or more services; sending, by the configurator, the first plan comprising a message associated with a first workflow step topic to a bus; determining whether a first service provider is able to execute the first workflow step topic; responsive to determining that the first service provider is able to execute the first workflow step topic, inserting, by the first service provider, a sub plan, into the first workflow step topic; and generating a final plan, wherein the final plan comprises one or more sub plans inserted into substantially all of the workflow steps of the first plan.

Another embodiment of the present invention provides a computer program product for constructing a plan for creating a cloud service, based on the method described above.

Another embodiment of the present invention provides a computer system constructing a plan for creating a cloud service, based on the method described above.

BRIEF DESCRIPTION OF THE DRAWINGS

FIG. 3A depicts a block diagram of an example of completed final plan construction, in accordance with an embodiment of the present invention; and FIG. 3B depicts a block diagram of an example of a generated final plan with transition points to log error information, in accordance with an embodiment of the present invention.

DETAILED DESCRIPTION

Embodiments of the present invention recognize the flexibility of a choreographic approach for realizing cloud services. Embodiments of the present invention provide a method which removes the requirement to know and maintain a final plan for each cloud service before the time of implementation and allows the updates of service providers without the need to modify the construction plan for the cloud service. Embodiments of the present invention provide methods and systems for dynamically constructing and executing a cloud service using a choreographic approach involving multiple actors, including log and trace information during the execution of the service to support failure analysis.

Figure 1:
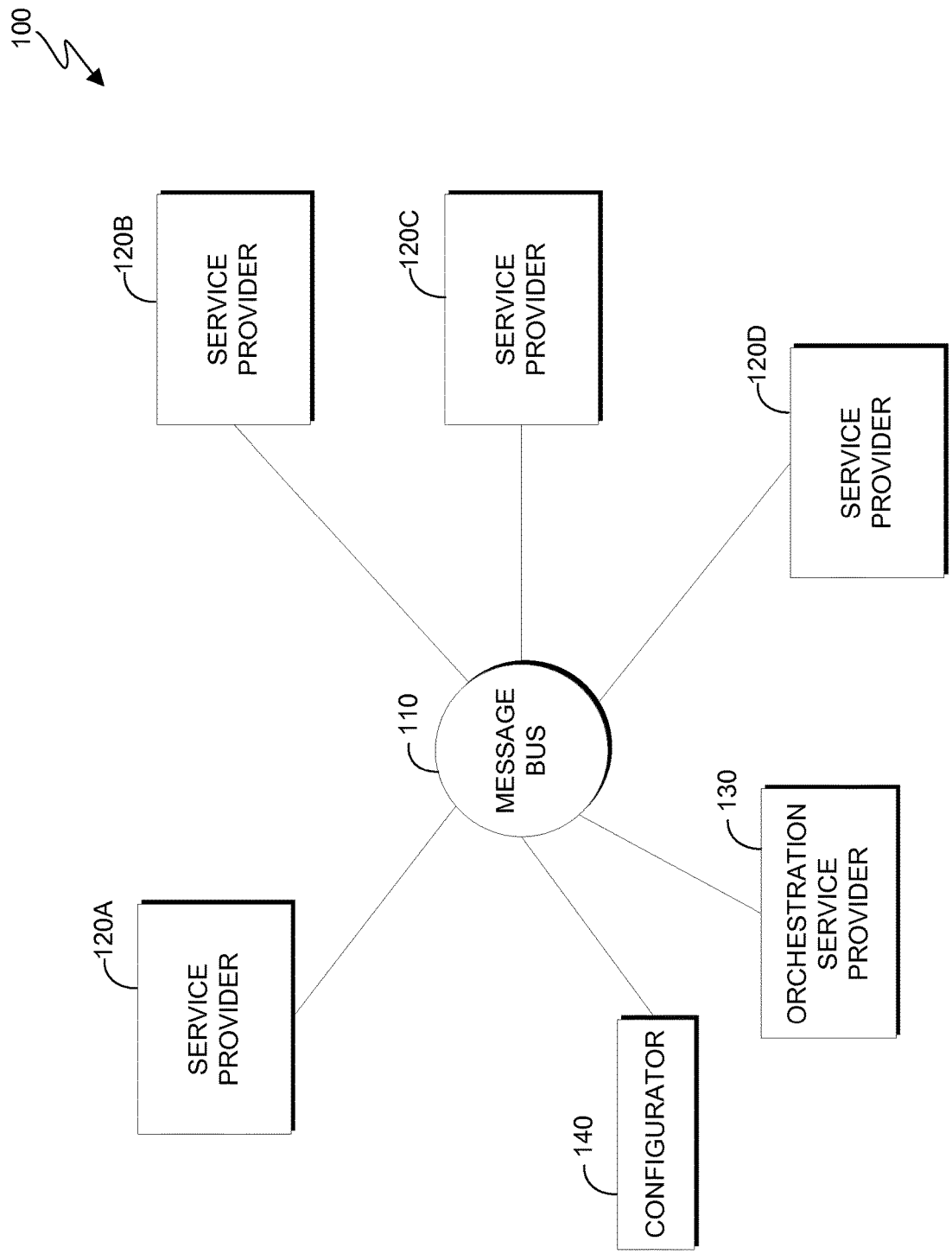
FIG. 1 depicts a functional block diagram of a configuring system, in accordance with an embodiment of the present invention.

The present invention will now be described in detail with reference to the Figures. FIG. 1 depicts a functional block diagram illustrating a configuring system, generally designated 100, in accordance with an embodiment of the present invention. Modifications to configuring system 100 may be made by those skilled in the art without departing from the scope of the invention as recited by the claims. In an exemplary embodiment, configuring system 100 includes message bus 110, service providers 120A-D, orchestration engine 130, and configurator 140.

Message bus 110 is a central application service which provides for communication between the components of configuring system 100, including each of service providers 120A-D, orchestration service provider 130, and configurator 140.

Service providers 120A-D define each service specification which is provided by configuring system 100. Service providers 120A-D are each configured to associate themselves with a particular category, provide a particular service, and fulfill requests. Service providers 120A-D can be used to provide cloud services according to requests from a user. While there are four (4) service providers depicted in FIG. 1, configuring system 100 can include any supportable number of service providers.

Orchestration service provider 130 is a specialized service provider which is registered against the topic of complete construction of the final plan.

Configurator 140 is an engine which allows a user to configure a cloud service, by selecting from a pool of attached service providers. Configurator 140 is capable of generating a preliminary plan of a cloud service, based on service providers registered with the system. Configurator 140 can attach descriptions to messages, and communicate information to, and from, service providers 120A-D, via message bus 110.

Figure 2A:
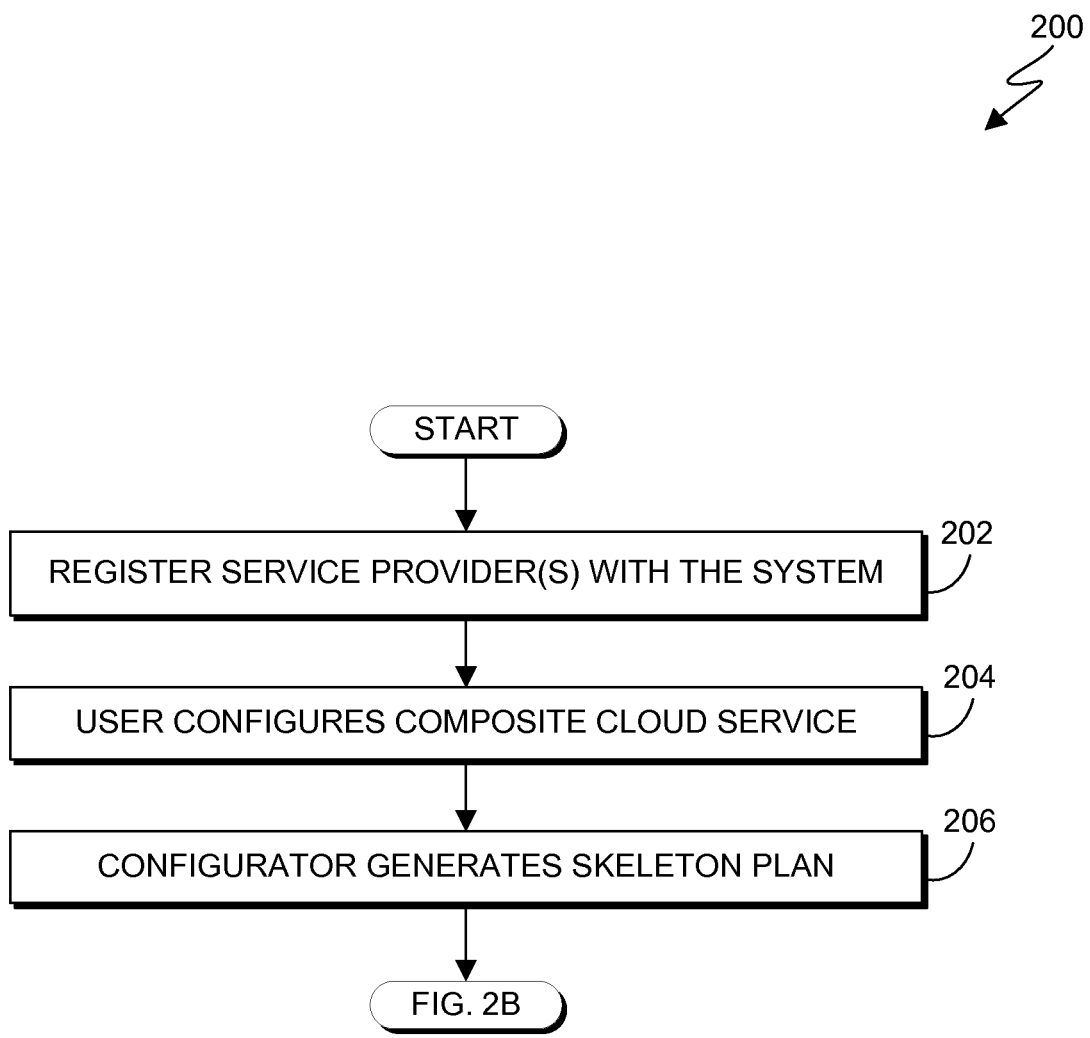
FIG. 2A depicts a flowchart illustrating operational steps for configuring a skeleton plan for creating a cloud service from a set of selected services, in accordance with an embodiment of the present invention.

FIG. 2A depicts flowchart 200 illustrating operational steps for configuring a skeleton plan for creating a cloud service from a set of selected services, in accordance with an embodiment of the present invention.

In step 202, service providers 120A-D are registered with configurator 140. In this exemplary embodiment, service providers 120A-D are registered to the system by connecting to message bus 110 and onboarding with configurator 140. Each of service providers 120A-D registers itself against a set of topics, and provides a data structure which each service provider in the same category is able to recognize and understand. For example, a TSAM service provider and an OpenStack service provider may both register themselves against the topic "compute service required."

In step 204, a user configures a particular cloud service. In this exemplary embodiment, a user configures a particular cloud service by selecting one or more services and submitting the service selections to configurator 140. The one or more services can be atomic services, one or more complex services, or a combination of both atomic services and complex services.

In step 206, configurator 140 generates a skeleton plan from the set of selected services. In this exemplary embodiment, configurator 140 uses information gathered from each service provider during the registration (step 202) and generates a rough description of the cloud service by ordering the selected services, based on the category of each service. For example, an ordering of selected services can be: (1) compute service, (2) network service, (3) storage service, (4) operating system (OS) monitoring service, (5) database service, and (6) database (DB) monitoring service (described further in FIG. 3A).

Figure 2B:
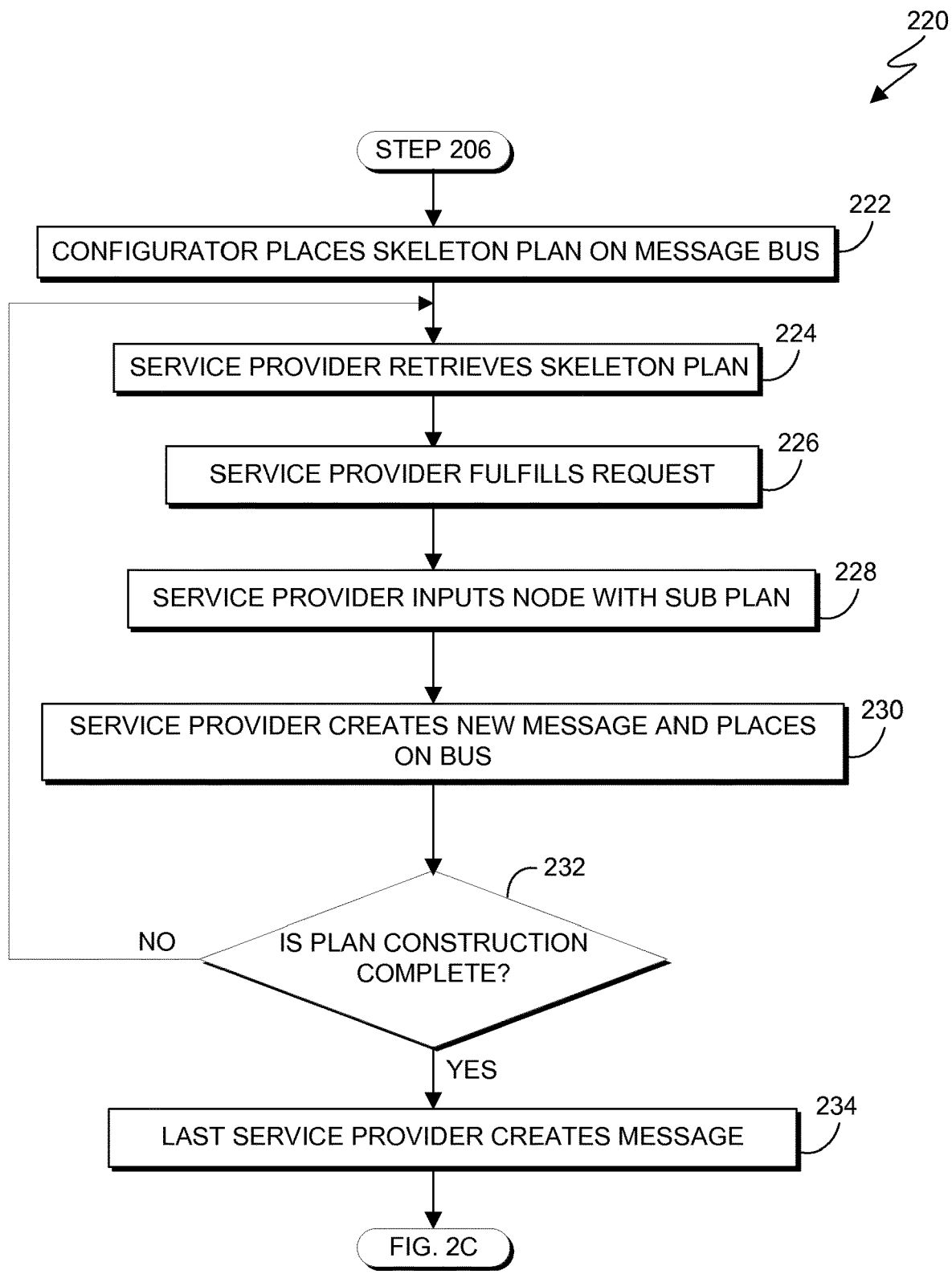
FIG. 2B depicts a flowchart illustrating operational steps for constructing a final plan from a skeleton plan received from the selected services, in accordance with an embodiment of the present invention.

FIG. 2B depicts flowchart 220 illustrating operational steps for constructing a final plan from a skeleton plan received from the selected services, in accordance with an embodiment of the present invention.

In step 222, configurator 140 places the generated skeleton plan (from step 206 of FIG. 2A) on message bus 110. In this exemplary embodiment, configurator 140 attaches the generated skeleton plan to a message and places the message on message bus 110, using the topic of the first service provider. For example, the message can include the topic of "compute service required" with the message content (e.g., AIX 7.1®, XL t-shirt size) including the skeleton plan, and relevant information for the next step(s) can be subsequently derived from the skeleton plan.

In step 224, a service provider retrieves the skeleton plan. In this exemplary embodiment, a first service provider who is registered against the topic of the message, retrieves the message from message bus 110. For example, the OpenStack service provider, which is registered against the topic "compute service required" can retrieve the message from message bus 110. In this exemplary embodiment, the message is distributed to each service provider who is registered to handle a particular topic. For example, both the OpenStack service provider and the TSAM service provider, which are registered against the "compute service required" topic, can retrieve the message from message bus 110.

In step 226, a service provider fulfills the request contained in the message. In this exemplary embodiment, the first service provider to receive the message and is able to handle the enclosed request will fulfill the request. For example, if the message is received by both the OpenStack service provider and the TSAM service provider, the TSAM service provider can indicate first that it is able to handle the message request, and then processes the request.

In step 228, the service provider fulfilling the request inputs the node with their sub plan. In this exemplary embodiment, the service provider which is handling the message request replaces the general topic placeholder node of the skeleton plan and inserts the specific steps (i.e., sub plan) required to fulfill the particular service. For example, the TSAM service provider can replace the "compute service" placeholder node with the specific steps (i.e., sub plan) required to create the "compute service", such as, (a) get network configuration, (b) create disk, and (c) create VM (described in further detail with respect to FIG. 3A).

In step 230, the service provider which fulfilled the request creates a new message and places the message on message bus 110. In this exemplary embodiment, the service provider which fulfilled the last request reads the next step from the skeleton plan message and creates a new message, containing the information for a request for the next service provider. For example, after the TSAM compute service provider fulfills the "compute service" request, the TSAM compute service provider can read that the next step in the request is "network service." The TSAM compute service provider can then create a new message that includes the topic of "network service required" with the message content (e.g., customer and back-up VLN, one service IP) including the updated plan (step 228) and the relevant information for the next step(s). After the creation of the new message, the service provider places the message back to message bus 110, for further retrieval and access by other service providers.

In step 232, the service provider determines whether the plan construction is complete. The plan construction is complete when the service provider fulfilling a request determines that the next node in the plan is an "end" node, indicating that there are no further steps to fulfill and that the plan construction is complete (i.e., final plan is constructed). If, in step 232, the service provider determines that the plan construction is not complete, then, in step 224, the next service provider retrieves the skeleton plan from message bus 110, and the operational steps continue as described above for each additional service provider.

Figure 2C:
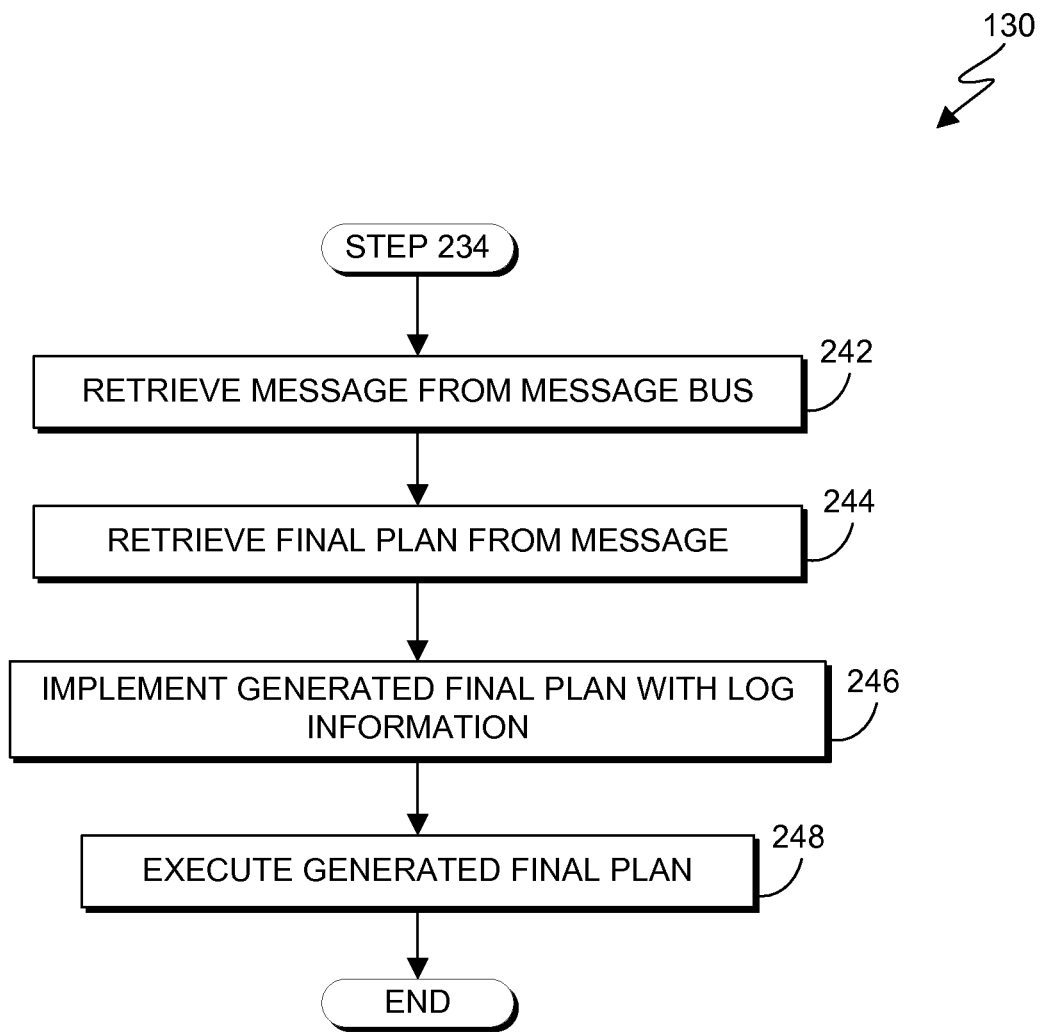
FIG. 2C depicts a flowchart illustrating operational steps for executing the constructed final plan, in accordance with an embodiment of the present invention.

If, in step 232, the service provider determines that the plan construction is complete, then, in step 234, the last service provider to fulfill its request creates a message to indicate that the plan construction is complete. The message is placed on message bus 110 for future retrieval and execution of the final plan (FIG. 2C). In some embodiments, validation and optimization of the final plan is completed before the final plan is executed. The final plan can be optimized by combining multiple sub plans to be executed by one service provider into a single task. This optimization can be performed by orchestration service provider 130 (i.e., final plan inspection and optimization before the final plan execution) or by one of service providers 120A-D (i.e., final plan inspection at the time of sub plan injection). Once a final plan is created, the final plan is cached to support multiple executions without the need to recreate that same plan. In another embodiment, a central plan construction service can be implemented, where a 'getPlanFragment' call is issued to each service provider, and each service provider returns its sub plan to inject into the skeleton plan. There is no specific knowledge about any of the service providers and no ability to translate the data map and dependencies into plan tasks.

Accordingly, by performing the operational steps of FIG. 2B, a complete detailed final service plan is constructed, using sub plans obtained from each relevant service provider.

FIG. 2C depicts a flowchart illustrating operational steps of orchestration service provider 130 for executing the constructed final plan, in accordance with an embodiment of the present invention.

In step 242, orchestration service provider 130 retrieves the message indicating the plan construction is complete (step 234 of FIG. 2B) from message bus 110. In this exemplary embodiment, orchestration service provider 130 is registered against the "plan construction complete" topic and knows to retrieve the message.

In step 244, orchestration service provider 130 retrieves the constructed final plan and information associated with the final plan, from the message.

In step 246, orchestration service provider 130 implements the generated final plan, along with log information. In this exemplary embodiment, orchestration service provider 130 generates transitions between each of the services, in order to aid in determining at which point an error has occurred, if the final plan execution fails at some point. The transitions act as a checkpoint, at which all the information is processed and logged before moving on to the next service. In this manner, orchestration service provider 130 contains the logs and traceability information for each checkpoint, and is better able to identify at which step of a sub plan an error may have occurred.

In step 248, orchestration service provider 130 executes the generated final plan. In this exemplary embodiment, orchestration service provider 130 executes the final plan as one process instance, and calls each service provider interface in the order specified in the final plan, along with the logging information at each transition (described in further detail in FIG. 3B). The message containing the final plan acts as a "per-thread-storage," eliminating the need to refer back to the central control when there is an error or failure, improving the overall performance of the system.

Accordingly, by performing the operational steps of FIG. 2C, the constructed final plan for a cloud service can be executed without being completely known before the time of implementation. Further, each service provider and the sub plan of each service provider can be updated, without the need to update the cloud service.

FIG. 3A depicts a block diagram of an example of completed final plan construction with sub plan information, in accordance with an embodiment of the present invention. Blocks 302, 304, 306, 308, 310, and 312 each represent a category of services. For example, in a particular plan, block 302 represents compute services, block 304 represents network services, block 306 represents storage services, block 308 represents OS monitoring services, block 310 represents database services, and block 312 represents DB monitoring services. Sub plan 301A-D represents the specific steps required of the service represented by block 302 to complete the service. For example, where block 302 represents compute services, sub plan 301A is 'get network configuration,' sub plan 301B is 'create disk,' sub plan 301C is 'create VM,' and sub plan 301D is 'OS deployment and config.' Similarly, sub plans 303A-B, 305A-C, 307A-B, 309A-B, and 311A-B each contain the specific steps required of the services represented by blocks 304, 306, 308, 310, and 312, respectively.

FIG. 3B depicts a block diagram of an example of a generated final plan with transition points to log error information, in accordance with an embodiment of the present invention. As depicted in both FIGS. 3A and 3B, sub plans 301A-D each represent the specific steps required to complete a particular service. Transitions 320, 330, 340, 350, and 360 are each checkpoints, placed between each set of sub plans. For example, transition 320 is placed between sub plans 301A-D (each corresponding to one category of services) and sub plans 303A-B (each corresponding to a second category of services). Similarly, each of transitions 330, 340, 350, and 360 are placed between a sub plan, each sub plan corresponding to a different category of services.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for constructing a plan for creating a cloud service, the method comprising the steps of:
    receiving, at a configurator which comprises a first processor, a request for a cloud service, wherein the configurator is connected to a bus, wherein the cloud service comprises one or more services, and wherein one or more service providers comprise a second processor and are configured to perform the one or more services;
    generating, by the configurator, a first plan comprising a plurality of nodes, wherein each node of the plurality of nodes corresponds to a workflow step topic of a plurality of workflow step topics;
    sending, by the configurator, the first plan comprising a message associated with a first workflow step topic to the bus, wherein the message includes content for updating each workflow step topic of the plurality of workflow step topics at specific execution points with a sub plan associated with a respective service provider that executes one or more services that satisfies the request while maintaining the first plan;
    determining whether a first service provider is able to execute the first workflow step topic;
    responsive to determining that the first service provider is able to execute the first workflow step topic, replacing a node of the plurality of nodes with a sub plan of the first service provider, wherein the sub plan comprises obtaining a network configuration, creating a disk, and creating a virtual machine (VM);
    generating the final plan, wherein the final plan comprises one or more sub plans inserted into the plurality of nodes of the first plan;
    optimizing the generated final plan before the final plan is executed by combining multiple sub plans by issuing a call to each service provider and receiving a corresponding sub plan from each service provider to inject into the multiple sub plans;
    during execution of the optimized final plan, inserting one or more transitions that serves as a checkpoint between service providers listed, and for each inserted transition, logging traceability information;
    identifying execution failures associated with the checkpoints, wherein the execution failures decrease a performance of the cloud service; and
    responsive to identifying the execution failures associated with the checkpoints, correcting the identified execution failures that decrease the performance of the cloud service by:
        removing sub plans associated with a service that caused an execution failure of the execution failures;
        selecting another service having sub plans that satisfies that requests; and
        inserting sub plans of the selected service into the generated final plan.

2. The method of claim 1, further comprising:
    enabling multiple executions of the final plan by caching the final plan; and
    requesting, by an orchestrator which comprises a third processor, execution of the final plan by at least one of the one or more service providers associated with the one or more services, wherein the orchestrator comprises a specialized service provider which is registered against a topic of complete construction of the final plan.

3. The method of claim 2, wherein the final plan is unknown prior to execution of the final plan by at least one of the one or more service providers associated with the one or more services, and the one or more service providers and the one or more sub plans are updated without the cloud service being updated.

4. The method of claim 1, further comprising:
inserting, by an orchestrator which comprises a third processor, traceability information between at least two of the workflow step topics representing the one or more services of the final plan.

5. The method of claim 4, wherein the orchestrator is configured to locate an error or a failure during execution of the final plan in the traceability information which acts as a per-thread-storage of the final plan.

6. The method of claim 1, further comprising:
determining whether a second service provider is able to execute a second workflow step topic;
responsive to determining that the second service provider is able to execute the second workflow step topic, inserting, by the second service provider, another sub plan into the second workflow step topic; and
sending, by the second service provider, a message to the bus, wherein the message comprises another workflow step topic associated with the plurality of nodes.

7. The method of claim 1, further comprising:
receiving, by a last service provider from the one or more service providers, an end message, wherein the end message indicates complete construction of the final plan.

8. A computer program product comprising:
a computer readable storage medium and program instructions stored on the computer readable storage medium, the program instructions comprising:
program instructions to receive, at a configurator which comprises a first processor, a request for a cloud service, wherein the configurator is connected to a bus, wherein the cloud service comprises one or more services, and wherein one or more service providers which comprise a second processor and are configured to perform the one or more services;
program instructions to generate, by the configurator, a first plan comprising a plurality of nodes, wherein each node of the plurality of nodes corresponds to a workflow step topic of a plurality of workflow step topics;
program instructions to send, by the configurator, the first plan comprising a message associated with a first workflow step topic to the bus, wherein the message includes content for updating each workflow step topic of the plurality of workflow step topics at specific execution points with a sub plan associated with a respective service provider that executes one or more services that satisfies the request while maintaining the first plan;
program instructions to determine whether a first service provider is able to execute the first workflow step topic;
program instructions, to responsive to determining that the first service provider is able to execute the first workflow step topic, replace a node of the plurality of nodes with a sub plan of the first service provider, wherein the node comprises a compute service node and the sub plan comprises obtaining a network configuration, creating a disk, and creating a virtual machine (VM);
program instructions to generate the final plan, wherein the final plan comprises one or more sub plans inserted into the plurality of nodes of the first plan;
program instructions to optimize the generated final plan before the final plan is executed by combining multiple sub plans by issuing a call to each service provider and receiving a corresponding sub plan from each service provider to inject into the multiple sub plans;
program instructions, to during execution of the optimized final plan, insert one or more transitions that serves as a checkpoint between service providers listed, and for each inserted transition, logging traceability information;
program instructions to identify execution failures associated with the checkpoints, wherein the execution failures decrease a performance of the cloud service; and
program instructions to, responsive to identifying the execution failures associated with the checkpoints, correct the identified execution failures that decrease the performance of the cloud service by:
removing sub plans associated with a service that caused an execution failure of the execution failures;
selecting another service having sub plans that satisfies that requests; and
inserting sub plans of the selected service into the generated final plan.

9. The computer program product of claim 8, further comprising:
program instructions to enable multiple executions of the final plan by caching the final plan; and
program instructions to request, by an orchestrator which comprises a third processor, execution of the final plan by at least one of the one or more service providers associated with the one or more services,
wherein the orchestrator comprises a specialized service provider which is registered against a topic of complete construction of the final plan.

10. The computer program product of claim 9, wherein the final plan is unknown prior to execution of the final plan by at least one of the one or more service providers associated with the one or more services, and the one or more service providers and the one or more sub plans are updated without the cloud service being updated.

11. The computer program product of claim 8, further comprising:
program instructions to insert, by an orchestrator which comprises a third processor, traceability information between at least two of the workflow step topics representing the one or more services of the final plan.

12. The computer program product of claim 11, wherein the orchestrator is configured to locate an error or a failure during execution of the final plan in the traceability information which acts as a per-thread-storage of the final plan.

13. The computer program product of claim 8, further comprising:
program instructions to determine whether a second service provider is able to execute a second workflow step topic;
program instructions to, responsive to determining that the second service provider is able to execute the second workflow step topic, insert, by the second service provider, another sub plan into the second workflow step topic; and program instructions to send, by the second service provider, a message to the bus, wherein the message comprises another workflow step topic associated with the plurality of nodes.

14. A computer system comprising:
one or more computer processors;
one or more computer readable storage media;
program instructions stored on the one or more computer readable storage media for execution by at least one of the one or more processors, the program instructions comprising:
program instructions to receive, at a configurator which comprises a first processor of the one or more processors, a request for a cloud service, wherein the configurator is connected to a bus, wherein the cloud service comprises one or more services which comprise a second processor of the one or more processors, and wherein one or more service providers are configured to perform the one or more services;
program instructions to generate, by the configurator, a first plan comprising a plurality of nodes, wherein each node of the plurality of nodes corresponds to a workflow step topic of a plurality of workflow step topics;
program instructions to send, by the configurator, the first plan comprising a message associated with a first workflow step topic to the bus, wherein the message includes content for updating each workflow step topic of the plurality of workflow step topics at specific execution points with a sub plan associated with a respective service provider that executes one or more services that satisfies the request while maintaining the first plan wherein the message comprises a topic of compute service required and relevant information for each workflow step;
program instructions to determine whether a first service provider is able to execute the first workflow step topic;
program instructions, to responsive to determining that the first service provider is able to execute the first workflow step topic, replace a node of the plurality of nodes with a sub plan of the first service provider, wherein the sub plan comprises obtaining a network configuration, creating a disk, and creating a virtual machine (VM);
program instructions to generate the final plan, wherein the final plan comprises one or more sub plans inserted into the plurality of nodes of the first plan;
program instructions to optimize the generated final plan before the final plan is executed by combining multiple sub plans by issuing a call to each service provider and receiving a corresponding sub plan from each service provider to inject into the multiple sub plans;
program instructions, to during execution of the optimized final plan, insert one or more transitions that serves as a checkpoint between service providers listed, and for each inserted transition, logging traceability information;
program instructions to identify execution failures associated with the checkpoints, wherein the execution failures decrease a performance of the cloud service; and program instructions to, responsive to identifying the execution failures associated with the checkpoints, correct the identified execution failures that decrease the performance of the cloud service by:
removing sub plans associated with a service that caused an execution failure of the execution failures;
selecting another service having sub plans that satisfies that requests; and
inserting sub plans of the selected service into the generated final plan.

15. The computer system of claim 14, further comprising:
program instructions to enable multiple executions of the final plan by caching the final plan; and
program instructions to request, by an orchestrator which comprises a third processor of the one or more processors, execution of the final plan by at least one of the one or more service providers associated with the one or more services,
wherein the orchestrator comprises a specialized service provider which is registered against a topic of complete construction of the final plan.

16. The computer system of claim 15, wherein the final plan is unknown prior to execution of the final plan by at least one of the one or more service providers associated with the one or more services, and the one or more service providers and the one or more sub plans are updated without the cloud service being updated.

17. The computer system of claim 14, further comprising:
program instructions to insert, by an orchestrator which comprises a third processor of the one or more processors, traceability information between at least two of the workflow step topics representing the one or more services of the final plan.

18. The computer system of claim 17, wherein the orchestrator is configured to locate an error or a failure during execution of the final plan in the traceability information which acts as a per-thread-storage of the final plan.

19. The computer system of claim 14, further comprising:
program instructions to determine whether a second service provider is able to execute a second workflow step topic;
program instructions to, responsive to determining that the second service provider is able to execute the second workflow step topic, insert, by the second service provider, another sub plan into the second workflow step topic; and
program instructions to send, by the second service provider, a message to the bus, wherein the message comprises another workflow step topic associated with the plurality of nodes.

20. The computer system of claim 14, further comprising:
program instructions to receive, by a last service provider from the one or more service providers, an end message, wherein the end message indicates complete construction of the final plan.

* * * * *